United States Patent
Hong et al.

(10) Patent No.: US 9,812,137 B2
(45) Date of Patent: Nov. 7, 2017

(54) DATA COMMUNICATION USING AUDIO PATTERNS SYSTEMS AND METHODS

(71) Applicant: PAYPAL, INC., San Jose, CA (US)

(72) Inventors: Ng Woo Hong, Singapore (SG); Yiqun Hu, Singapore (SG); Ider Cheng, Taipei (TW)

(73) Assignee: PAYPAL, INC., San Jose, CA (US)

( * ) Notice: Subject to any disclaimer, the term of this patent is extended or adjusted under 35 U.S.C. 154(b) by 292 days.

(21) Appl. No.: 13/930,728

(22) Filed: Jun. 28, 2013

(65) Prior Publication Data

US 2014/0029768 A1  Jan. 30, 2014

Related U.S. Application Data

(60) Provisional application No. 61/675,662, filed on Jul. 25, 2012.

(51) Int. Cl.
*G10L 19/018* (2013.01)

(52) U.S. Cl.
CPC ................... *G10L 19/018* (2013.01)

(58) Field of Classification Search
CPC .................................................. G10L 19/018
USPC ..................................................... 381/56, 58
See application file for complete search history.

(56) References Cited

U.S. PATENT DOCUMENTS

| | | | |
|---|---|---|---|
| 5,864,820 A | | 1/1999 | Case |
| 6,389,055 B1 * | | 5/2002 | August et al. ................. 375/130 |
| 6,696,989 B2 * | | 2/2004 | Katayama et al. ............. 341/51 |
| 7,334,735 B1 * | | 2/2008 | Antebi et al. .................. 235/492 |
| 7,711,564 B2 * | | 5/2010 | Levy et al. ..................... 704/270 |
| 7,796,978 B2 * | | 9/2010 | Jones et al. ................. 455/414.3 |
| 8,401,569 B1 | | 3/2013 | Bell et al. |
| 8,521,217 B2 * | | 8/2013 | Rodriguez ................. 455/550.1 |
| 8,989,883 B2 * | | 3/2015 | Shah et al. ....................... 700/94 |
| 2001/0055391 A1 | | 12/2001 | Jacobs |
| 2003/0081781 A1 | | 5/2003 | Jensen et al. |
| 2004/0102961 A1 | | 5/2004 | Jensen et al. |
| 2006/0107195 A1 * | | 5/2006 | Ramaswamy et al. ..... 715/500.1 |
| 2008/0228575 A1 | | 9/2008 | Silberstein et al. |
| 2009/0132391 A1 * | | 5/2009 | Jacobs ............... G06Q 30/0601 705/26.1 |
| 2010/0114344 A1 * | | 5/2010 | Hannaby ......................... 700/94 |
| 2010/0134278 A1 | | 6/2010 | Srinivasan et al. |
| 2010/0280641 A1 | | 11/2010 | Harkness et al. |
| 2012/0075083 A1 | | 3/2012 | Isaacs |
| 2012/0295560 A1 | | 11/2012 | Mufti |
| 2013/0171926 A1 * | | 7/2013 | Perret ................... G10L 19/018 455/3.06 |

FOREIGN PATENT DOCUMENTS

EP         1 276 318         1/2003
WO    WO 2012/159048    11/2012

* cited by examiner

*Primary Examiner* — Davetta W Goins
*Assistant Examiner* — Daniel Sellers
(74) *Attorney, Agent, or Firm* — Haynes and Boone, LLP

(57) ABSTRACT

Systems and methods for data communication using audio patterns are described. The methods include encoding a message into an audio pattern, mixing the audio pattern with an audio content to obtain a mixed audio content, wherein the audio pattern is inaudible in the mixed audio content, and transmitting the mixed audio content.

21 Claims, 6 Drawing Sheets

DATA COMMUNICATION USING AUDIO PATTERNS SYSTEMS AND METHODS

CROSS REFERENCE TO RELATED APPLICATION

The present application is related to and claims priority to U.S. Provisional Patent Application No. 61/675,662 filed Jul. 25, 2012, which is incorporated by reference in its entirety.

BACKGROUND

Field of the Invention

The invention is directed towards methods and systems for data communication using audio patterns.

Related Art

Advertisers broadcast commercials to consumers daily in quick short segments often containing densely packed information. While consumers may desire the product being advertised, often situational circumstances lead to the consumers ignoring the commercial. For example, drivers and passengers in a vehicle may be preoccupied or unable to record advertisement information. Additionally, these people may fail to recall product names or phone numbers when they reach their destination.

In other circumstances, advertisers may wish to make consumers aware of locally available products or coupons. When confronted with handouts, fliers, or other advertisements, consumers tend to decline invitations to discuss products or receive coupons. Thus, only certain consumers aware of what is locally available or actively searching for the product receive benefits from the advertisements.

It is becoming increasingly common for consumers to carry and utilize personal devices, such as mobile cellular phones, personal digital assistants (PDAs), tablet computers, or other portable devices to search for products and coupons. However, this still requires a consumer to take an active step in finding the product, and may not immediately make the consumer aware of product details. Thus, a need exists for systems and methods that communicate data using audio patterns.

Figure 1:
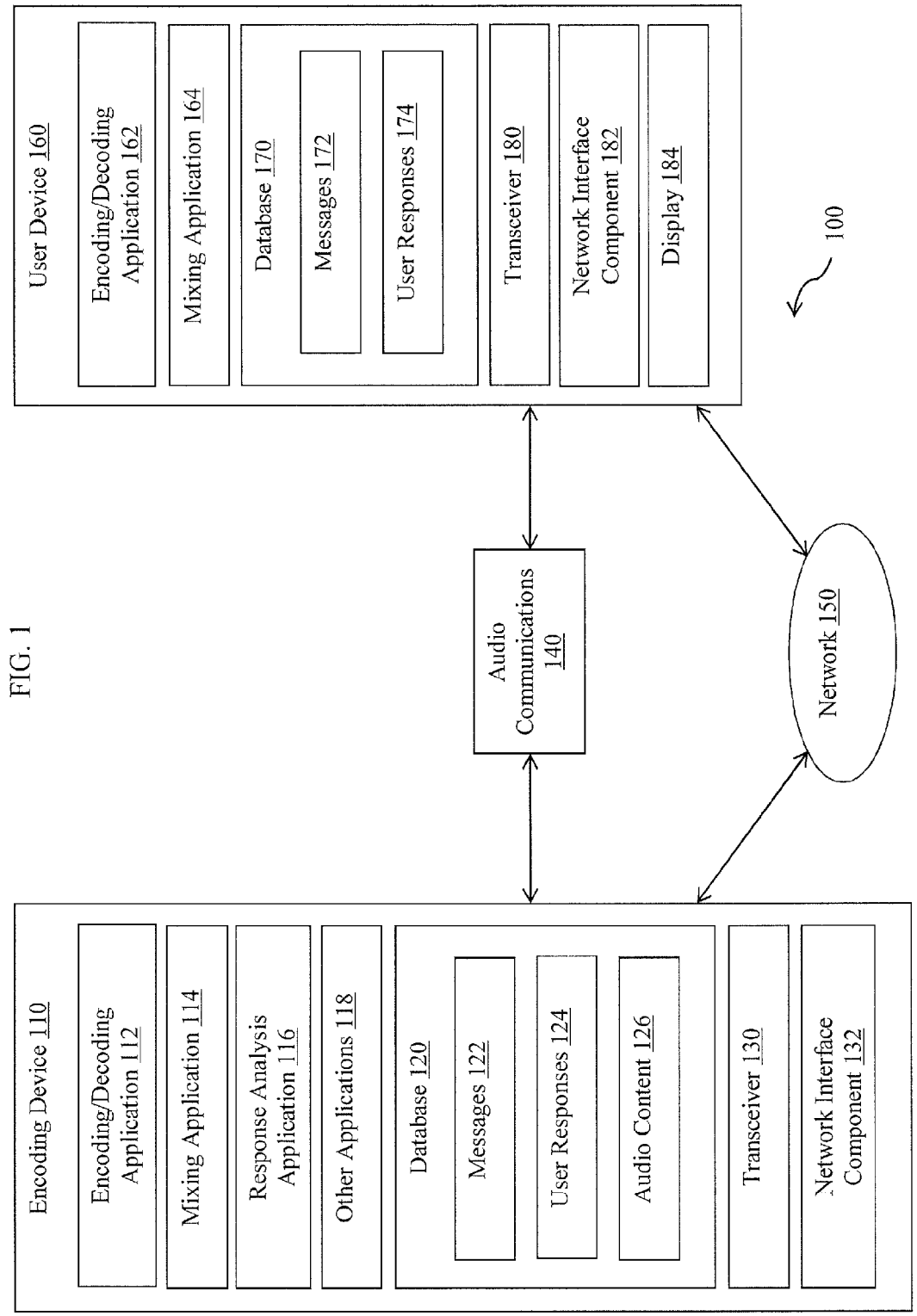
FIG. 1 is a block diagram of a networked system suitable for implementing the methods described herein according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides systems and methods for data communication using audio patterns. An encoding device may be one or a plurality of servers, devices, or other processing units utilized to encode and/or transmit audio patterns. The systems and methods described herein encode messages, such as text and data messages and executable processes into an audio pattern receivable by a transceiver of a user device. Additionally, the encoding device may mix the audio pattern with an additional audio content. The encoding device may transmit the audio pattern with the audio content so that the audio pattern is inaudible to a human ear during playback of the audio content. The audio pattern may be made inaudible by using specific audio frequencies normally inaudible to a human, by using low power or amplitude (decibel) sound waves, through audio masking, or any combination of the aforementioned and/or other techniques. In response to the transmission of the audio pattern, a device containing a decoding feature may be activated. Upon receiving the audio pattern, the device may determine and decode the audio pattern to receive the underlying message. Thus, the device may then display the message and execute any embedded processes.

In a specific embodiment, an encoding device may correspond to, or be utilized by, a media content provider, such as a television broadcast station, radio broadcast station, website with media content, or other content provider. When the media content provider transmits media content, such as a television commercial, the media content provider may simultaneously transmit a message. For example, a television broadcast station may wish to transmit a data message containing product details, contact information, and coupons with the television commercial. The television broadcast station may encode the message into an audio pattern. The audio pattern may then be mixed with the audio portion of the television commercial so that the audio portion is inaudible. Thus, when the television commercial is broadcast, the audio pattern is similarly broadcast, but inaudible to a viewer of the commercial. The viewer may then activate a user device containing an associated decoding program during the commercial. In certain embodiments, the viewer may be instructed to activate the decoding program. After the mixed audio content is received by the user device, the audio pattern is determined and decoded, the user device may then display the data message. The data message may include processes for execution by the user device as well, such as by navigating a web browser of the user device to a product and/or a payment service provider. In some embodiments, the systems and methods may also provide for a similar reception of audio patterns or other data by the encoding device from the user device, for example if the encoding device is network connected or local to the user device.

FIG. 1 illustrates an exemplary embodiment of a system environment 100 for implementing one or more processes described herein through audio communications 140. As shown, system environment 100 may comprise or implement a plurality of devices, servers, and/or software components that operate to perform various methodologies in accordance with the described embodiments. Exemplary devices and servers may include, for example, devices, stand-alone, and enterprise-class servers, operating an OS such as a MICROSOFT® OS, a UNIX® OS, a LINUX®

OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

As shown in FIG. 1, system environment 100 includes encoding device 110 and user device 160 in communication using audio communications 140 and/or over network 150. Encoding device 110 may be maintained by an audio and/or audiovisual content provider, such as a website containing media content, a broadcast television station, and/or a radio broadcast station, for example. However, in other embodiments, encoding device 110 may correspond to a service provider such as Ebay®, Inc. of San Jose, Calif. and PayPal®, Inc. of San Jose, Calif. utilizing a local or external audio transmission means. Furthermore, in other embodiments, encoding device 110 may correspond to any appropriate audio transmission and/or reception device, such as a personal computer or system of networked computers, personal digital assistant (PDA), mobile cellular phone, tablet computer, or other device. Although an encoding device is shown, the encoding device may be managed or controlled by any suitable encoding platform, such as a server with encoding software, or other encoding platform. Although only one device is shown, a plurality of devices may be utilized.

Encoding device 110 and user device 160 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system environment 100, and/or accessible over network 150.

Audio communications 140 may correspond to audio transmissions, such as audio patterns and/or audio content. In certain embodiments, audio communications 140 may include an audio pattern corresponding to an encoded message. The audio pattern may be inaudible during transmission to a user; however, the audio pattern may be perceptible to encoding device 110 and/or user device 160. In other embodiments, audio communications 140 may include audio content transmitted and/or mixed with the audio pattern. Audio communications 140 may correspond to audio content mixed with the audio pattern so that the audio pattern is inaudible to the user but perceptible to user device 160. In the example of FIG. 1, audio communications 140 are both transmittable and receivable by both encoding device 110 and user device 160. However, in other embodiments, audio communications 140 may be transmittable and/or receivable by only one of encoding device 110 and user device 160.

Audio patterns included in audio communications 140 may be made inaudible by using specific frequency ranges outside of those normally perceivable to an ordinary listener of audio communications 140. Thus, the ordinary listener may be a specific demographic of persons who would normally hear audio communications 140. The ordinary listener may be a listener of a target demographic, such as age 20, 30, 40, etc. as deemed appropriate. However, as a person is less likely to perceive higher frequency ranges as the person ages, this may be included into the consideration of the frequency chosen for the audio pattern. As an audio pattern frequency of 19 kHz is at the upper limit of perceivable sounds by an ordinary person across all age ranges, a 19 kHz wave may be generally used. However, lower frequency waves may be used where the population is known to be of a different demographic. In generally, a sound wave of 15 kHz to 20 kHz may be used and be made inaudible to the ordinary person depending on the target demographic.

Additionally, audio patterns may include different amplitude or decibel (dB) ranges in order to make an audio pattern inaudible in audio communications 140. For example, high frequency audio patterns, i.e. 18-20 kHz, may be audible to some humans at high, i.e. >85 dB, however, that frequency may be inaudible at lower dB values. Thus, lower frequency values may be used at normal dB ranges, such as 60-80 dB.

Audio patterns may be further made inaudible in audio communications 140 by utilizing audio masking. Audio masking may allow for the audio pattern to be perceived only by a user device containing an audio decoding application. For example, audio masking may allow for the encoded audio pattern to be mixed with audio content in audio communications 140 to create an audio pattern that cannot be perceived to a person listening to audio communications 140, however, the audio pattern is perceptible using an audio decoding application, such as by separating to audio pattern and the audio content in audio communications 140.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by encoding device 110 and user device 160.

Encoding device 110 may be implemented using any appropriate hardware and software configured for audio pattern encoding of messages 122. Encoding device 110 is shown configured for transmission and/or reception of audio communications 140 and wired and/or wireless communication over network 150. Encoding device 110 may correspond to an audio and/or audiovisual content provider, which may provide audio and/or audiovisual content with a platform for transmission of the audio and/or audiovisual content, for example. In this regard, encoding device 110 includes one or more encoding/decoding applications 112 which may be configured to interact with user device 160 through audio communications 140 to facilitate transmitting messages 122. In other embodiments, encoding device 110 may be external to but utilized with an audio and/or audiovisual content provider, such as an external device, server, or other encoding platform accessible to encode messages 122 for local and/or external audio transmission. In such an example, encoding device 110 may correspond to services provided by Ebay®, Inc. of San Jose, Calif. and PayPal®, Inc. of San Jose, Calif., USA.

Encoding device 110 of FIG. 1 is shown with encoding/decoding application 112, mixing application 114, response analysis application 116, and other applications 118. Encoding/decoding application 112, mixing application 114, response analysis application 116, and other applications 118 may correspond to processes, procedures, and/or applications executable by a hardware processor, for example, a software program.

Additionally, encoding device 110 is shown with database 120 having messages 122, user responses 124, and audio content 126. Database 120 may correspond to a data collection stored in a memory of encoding device 110 and containing messages 122, user responses 124, and audio content 126. Messages 122 may include text, image, and data messages corresponding to a desired transmission. For example, messages 122 may correspond to a text, image, or data message of an advertisement, coupon, purchase option, and/or social network interaction. Messages 122 may also or further contain URL's and/or embedded hyperlinks to webpages containing content. Data contained in messages 122 may correspond to one or a plurality of processes for execution by a receiving device, such as user device 160. Messages 122 may be transmittable to user device 160 using audio pattern encoding as will be described in further detail below. User responses 124 may include data corresponding to user reactions to messages 122, for example, deleting or ignoring messages 122, purchasing a product associated with messages 122, or other response. User responses 124 may be received by encoding device 110 from user device 160 using a similar audio pattern encoding as will be described in further detail below, or over network 150. Audio content 126 may correspond to an audio content, such as an audio track of an audiovisual broadcast, a radio broadcast, or other audio content.

Encoding/decoding application 112 may correspond to a software program executable by a hardware processor that is configured to encode messages 122 in database 120. Encoding/decoding application 112 may include processes for encoding messages 122 into audio patterns. The audio pattern may correspond to a sound wave pattern that is decodable by an application with knowledge of the encoding/decoding scheme. The audio pattern created by encoding/decoding application 112 and messages 122 may be configured so the sound wave is normally inaudible to a user. Additionally, encoding/decoding application 112 may include processes for decoding audio patterns contained in audio communications 140 transmitted from user device 160.

Encoding/decoding application 112, in various embodiments, may include a device recognition and/or calibration process. Encoding/decoding application 112 may take into account the device and/or process an audio pattern will be received. Thus, encoding device 110 may receive information that a microphone/transceiver of a user device, such as transceiver 180 of user device 160, may only receive audio patterns of frequencies up to 17 kHz. The encoding/decoding application 112 may adjust frequency ranges and/or decibel ranges of the audio pattern to include this information. Encoding/decoding application 112, in certain embodiments, may receive this information through a calibration and/or communication process with the user device or may receive user device information through user input.

Mixing application 114 of encoding device 110 may correspond to a software program executable by a processor that is configured to mix an audio pattern encoded from messages 122 with audio content 126. Mixing application 114 may be configured to mix the audio pattern with audio content 126 so that the audio pattern is inaudible to a human ear during playback of audio content 126 and audio content 126 is not distorted by the audio pattern.

Response analysis application 116 may correspond to a software program executable to receive and analyze user responses 124 to messages 122. Encoding device 110 may receive user responses 124 through audio communication 140 from user device 160, or over network 150. User responses 124 may include actions taken by a user of user device 160 in response to messages 122. For example, in one embodiment, messages 122 may include an advertisement for transmission to user device 160. After the user of user device 160 views the advertisement, the user may ignore and/or delete the advertisement, respond to the advertisement and purchase a product associated with the advertisement, or may otherwise react, creating user responses 124. Encoding device may receive user responses 124 as separately encoded audio patterns transmitted by user device 160, or over network 150 from user device 160. A processor of encoding device 110 may store user responses 124 to database 120. During execution of response analysis application 116, user responses 124 may be utilized to determine an effectiveness of messages 122 and/or a transmission strategy of messages 122. For example, specific messages of messages 122 may be determined to be more effective, and thus chosen to be transmitted more often. In other embodiments, response analysis application 116 may be utilized to provide analytics corresponding to user responses 124 to messages 122.

In one embodiment, other applications 118 contain software programs, such as a graphical user interface (GUI), executable by a processor that is configured to interface and communicate with the one or more audio and/or audiovisual content providers, client devices, and/or user device 160 via the network 150. The GUI enables the advertisers, product developers, or other entities to access and communicate with encoding device 110, for example to transmit messages 122 to encoding device 110. Other applications 118 may include further applications, such as an audio control and input/output application for use of transceiver 132, network connection applications, web browsers, and/or any other applications necessary for the described functions of encoding device 110.

In various embodiments, other applications 118 may provide additional features for encoding server 110. For example, these other applications 118 may include security applications for implementing client-side security features, programmatic client applications for interfacing with appropriate application programming interfaces (APIs) over the network 150 or various other types of generally known programs and/or applications.

Shown as part of encoding device 110 are transceiver 130 and network interface component 132. Transceiver 130 may correspond to a device including both a transmitter and a receiver for audio communications 140. Transceiver 130 may include an audio transmitter and receiver controllable by a processor of encoding device 110. Encoding device 110 may utilize transceiver 130 to transmit and/or receive at least an audio pattern as audio communications 140. In other embodiments, transceiver 130 may be further configured to transmit audio content 126 and/or audio content 126 mixed with the audio pattern as audio communications 140. Thus, audio communications 140 transmitted by transceiver 130 of encoding server 110 may correspond to at least an audio pattern encoded by encoding/decoding application 112 from messages 122 and may further include audio content 126 mixed with or separate from the audio pattern.

Encoding device 110, in various embodiments, may include at least one network interface component (NIC) 132 adapted to communicate with network 150 including user device 160. In various embodiments, network interface component 132 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Moving to user device 160, user device 160 may correspond to an interactive device for audio transmission and/or reception, such as a personal computer or system of networked computers, PDA, mobile cellular phone, tablet computer, or other device. Although a user device is shown, the user device may be managed or controlled by any suitable processing device. Although only one user device is shown, a plurality of user devices may be utilized.

User device 160 may be implemented using any appropriate hardware and software configured for reception and audio pattern decoding of audio communications 140. User device 160 is shown configured for transmission and/or reception of audio communications 140 and wired and/or wireless communication over network 150. User device 160 may correspond to an audiovisual output device, which may provide audiovisual output for a user to consume, for example. In this regard, user device 160 includes one or more encoding/decoding applications 162 which may be configured to interact with encoding device 110 through audio communications 140 to facilitate transmitting messages 122.

User device 160 is shown with encoding/decoding application 162 and other applications 164. Encoding/decoding application 162 and other applications 164 may correspond to processes, procedures, and/or applications executable by a hardware processor, for example, a software program. Encoding/decoding application 162 may include processes for encoding user responses 174 into audio patterns. The audio pattern may correspond to a sound wave pattern that is decodable by an application with knowledge of the encoding/decoding scheme. The audio pattern created by encoding/decoding application 162 and user responses 174 may be configured so the sound wave is normally inaudible to a user. Additionally, encoding/decoding application 162 may include processes for decoding audio patterns contained in audio communications 140 transmitted from encoding device 110. Thus, encoding/decoding application 162 may include an iteration of the same application as encoding/decoding application 112, or may contain different processes as necessary for user device 160.

In one embodiment, other applications 164 contain software programs, such as a graphical user interface (GUI), executable by a processor that is configured to interface and communicate with the one or more audio and/or audiovisual content providers, client devices, and/or encoding device 110 via the network 150. The GUI enables the advertisers, product developers, or other entities to access and communicate with user device 160, for example to receive user responses 174 from user device 160. Other applications 164 may include further applications, such as an audio control and input/output application for use of transceiver 180, network connection applications, and/or any other applications necessary for the described functions of user device 160.

In various embodiments, other applications 164 may provide additional features to a user of user device 160. For example, these other applications 164 may include security applications for implementing client-side security features, programmatic client applications for interfacing with appropriate application programming interfaces (APIs) over the network 150 or various other types of generally known programs and/or applications.

Additionally, user device 160 is shown with database 170 having messages 172 and user responses 174. Database 170 may correspond to a data collection stored in a memory of user device 160 and containing messages 172 and user responses 174. Messages 172 may include text, image, and data messages corresponding to a received transmission. For example, messages 172 may correspond to a text, image, or data message of an advertisement, coupon, purchase option, and/or social network interaction. Data contained in messages 172 may correspond to one or a plurality of processes for execution by user device 160. Messages 172 may be received from encoding device 110 using an audio pattern encoding method as will be described in further detail below. Thus, messages 172 may contain an iteration of the same information contained in messages 122, or, in other embodiments, may contain different information. User responses 174 may include data corresponding to user responses to messages 172, for example, deleting or ignoring messages 172, purchasing a product associated with messages 172, or other response. User responses 174 may be transmittable to encoding device 110 using an audio pattern encoding method as will be described in further detail below or over network 150. Thus, user responses 174 may contain an iteration of the same information contained in user responses 124, or, in other embodiments, may contain different information.

User device 160 contains transceiver 180, network interface component 182, and display 184. Transceiver 180 may correspond to a device including both a transmitter and a receiver for audio communications 140. Transceiver 180 may include an audio transmitter and receiver controllable by a processor of user device 160. User device 160 may utilize transceiver 180 to transmit and/or receive at least an audio pattern as audio communications 140.

User device 160, in various embodiments, may include at least one network interface component (NIC) 182 adapted to communicate with network 150 including encoding device 110. In various embodiments, network interface component 182 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

User device 160 includes display 184. Display 184 may correspond to a display controllable by a processor of user device 160 for use with rendering and displaying applications and associated data. In certain embodiments, display 184 may be utilized to display messages 172 after an audio pattern has been decoded. Display 184 may be implemented as a liquid-crystal display, plasma display panel, cathode ray tube, or other display.

Figure 2:
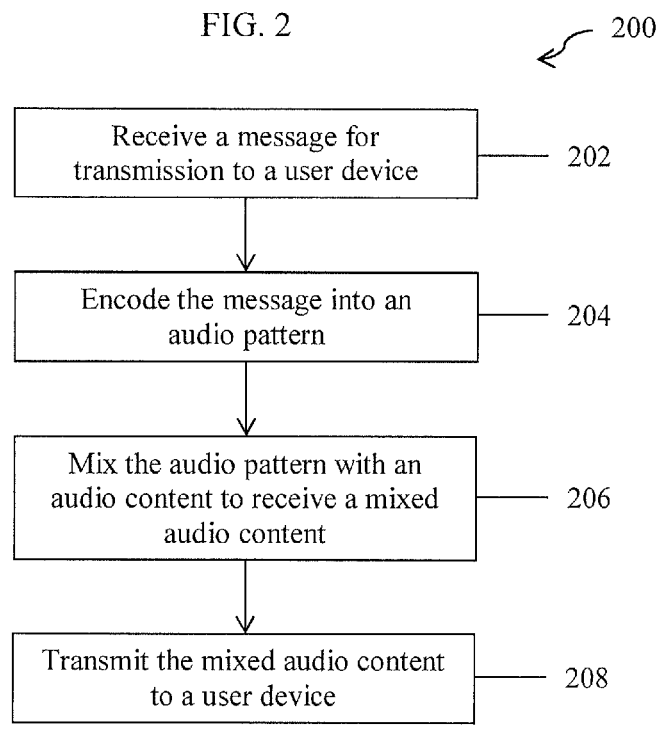
FIG. 2 is a flowchart showing a method of data communication using audio patterns by an encoding device.

Referring now to FIG. 2, a method flowchart 200 of data communication by an encoding device using audio patterns of the present disclosure is illustrated. At step 202, an encoding device, such as encoding device 110, receives a message for transmission to a user device. The encoding device may correspond to a service provider, for example, the payment provider PayPal®, Inc. of San Jose, Calif. In one embodiment, the messages may be messages 122 stored in database 120. Additionally, in certain embodiments, messages 122 may contain a process for execution by a user device, such as user device 160. The messages may be received from an outside source, such as a media content provider, for use with an audio portion of media content. The messages may also be input into the encoding device, for example, using an input device such as a keyboard or mouse.

At step 204, the message is encoded into an audio pattern by the encoding device. An encoding process or application, for example, encoding/decoding application 112, may perform the encoding. The encoding/decoding application may perform the encoding using messages 122 received at step 202.

Encoding of the audio pattern from messages 122 may be done using an audio encoding technology. The audio encoding technology may utilize a coding scheme where text and/or data is translated into binary values, which may then be encoded. For example, letters and digits may be mapped to a binary value. Below is a table showing text and digits mapped to binary values between 0 and 44, which may be encoded by 6 bits, where C is the character, and V is the binary value.

| C | V |
|---|---|
| 0 | 0 |
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| a | 10 |
| b | 11 |
| c | 12 |
| d | 13 |
| e | 14 |
| f | 15 |
| g | 16 |
| h | 17 |
| i | 18 |
| j | 19 |
| k | 20 |
| l | 21 |
| m | 22 |
| n | 23 |
| o | 24 |
| p | 25 |
| q | 26 |
| r | 27 |
| s | 28 |
| t | 29 |
| u | 30 |
| v | 31 |
| w | 32 |
| x | 33 |
| y | 34 |
| z | 35 |
| sp | 36 |
| $ | 37 |
| % | 38 |
| * | 39 |
| + | 40 |
| − | 41 |
| . | 42 |
| / | 43 |
| : | 44 |

However, in other embodiments, coding schemes may include different mapping as required. For example, more binary numbers, and thus more bits may be required for larger character libraries.

In addition to encoding a message into binary values, additional code may be added to the start of the binary stream for transmission to the user device. For example, when converting the text or data to a stream of binary values, a start notification or "flag" may be inserted at the beginning of the stream to designate that point as the stream start. The start notification may be designated as a field of specific bit length and content. In one embodiment, the start notification may include an 8 bit field of all bit 1s.

Additionally, a length field may be added to indicate the length of the data in the stream. The length field may include a field next to the start notification with a binary value. In one embodiment, the length field may include a 6 bit binary value indicating the length of textual information contained in the message when using the above mapped characters.

In order to avoid errors in the stream, a longitudinal redundancy check (LRC) sum may be implemented and inserted to the end of the binary stream. Under the LRC sum system, the binary stream may be divided into longitudinal groups of specific bits amounts and a single bit parity code may be computed from every longitudinal group. In one embodiment, the longitudinal parity group contains 8 bits, and the single bit parity code is computed from the number of times bit 1 occurs in the group. If the number of times 1 occurs is odd, then the parity code is set to 1, otherwise it is set to 0. If the last group contains less than 8 bits, the parity code is computed in the same way. The LRC sum code may then be computed and the LRC sum group includes an "X" bit binary stream containing the single bit parity codes, where "X" equals the number of longitudinal groups.

The binary values may be transformed into the audio pattern by utilizing a sound wave, such as an audio sine wave. The sound wave may be high frequency, such as an inaudible 19 kHz sine sound wave, in order to make the sound wave normally inaudible to a user. The high frequency sound wave may correspond to a binary value, for example 1, while silence corresponds to 0. However, in other embodiments, a different pattern may be utilized. For example, a "triple chunk" pattern may be utilized, wherein, when assigning 1 to an audio signal group, a sample of a sine wave with a known length, and a specific inaudible frequency, such as 19 kHz, may be placed between two samples of silence of the same known length to form the group. Additionally, in such an encoding scheme, 0 may also correspond to three samples of silence using the known length. Each sample is designated as a "chunk." Thus, in such an audio pattern, a binary triple of 3 bits is used to indicate the audio pattern of a bit, where 010, corresponding to silence/audio sine wave/silence, is used to indicate 1 and 000, corresponding to silence/silence/silence, is used to indicate 0.

When utilizing a "triple chunk" pattern, the sound wave may be made further inaudible by adjusting the amplitude of the sound wave corresponding to the 19 kHz sine wave. For example, the sound wave amplitude at 19 kHz may be linearly increased from 0 to 1 over the first half of the sample, and linearly decreased from 1 to 0 over the second half of the wave sample. For silent samples, a wave of any frequency with zero amplitude may be utilized. Utilizing a sound wave of this specific design, it is possible to robustly detect and decode the resulting audio pattern.

Once the message has been encoded into an audio pattern, the encoding device may contain audio content for transmission with the audio pattern. At step 206, the audio pattern encoded at step 204 is further mixed with audio content, such as audio content 126 in database 120. The audio content may correspond to an audio track of an audiovisual content, such as a television broadcast, or may correspond to a separate audio content, such as a radio broadcast. The audio pattern may be mixed with the audio content in such a way so that the audio pattern is inaudible to an audience consuming the audio content, but is perceptible to a user device, such as user device 160. Using the above described "triple chunk" method with a 19 kHz wave of varying amplitude, the audio pattern may be both inaudible and unique to noises from other sound sources.

Thus, the encoding device has an audio communication containing at least an audio pattern corresponding to a transmittable message. Finally, at step 208, the encoding device transmits the mixed audio content to a user device. The user device may correspond to user device 160, and may include a corresponding encoding/decoding application for use in decoding the audio pattern, as will be discussed in further reference to flowchart 300 of FIG. 3.

Figure 3:
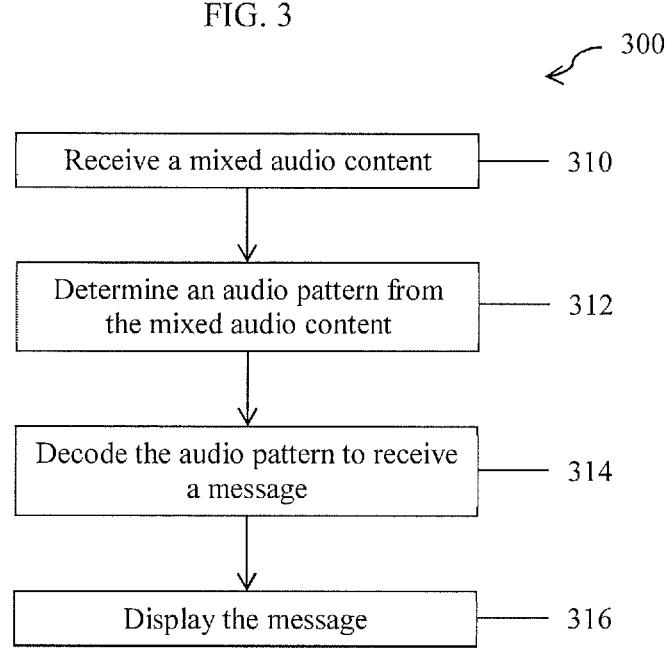
FIG. 3 is a flowchart showing a method of data communication using audio patterns by a user device.

Moving now to FIG. 3, a method flowchart 300 of data communications with a user device using audio patterns of the present disclosure is illustrated. At step 310, a user device, such as user device 160, receives a mixed audio content, for example from encoding device 110 as described in method flowchart 200 of FIG. 2. The user device may correspond to an interactive device configured to receive audio communications, such as a personal computer or system of networked computers, PDA, mobile cellular phone, tablet computer, or other device. The mixed audio content may correspond to audio communications 140 and, as previously discussed, contain messages 122 encoded into an audio pattern and mixed with audio content 126.

A user may be instructed to activate a user device to receive the mixed audio content during playback of the mixed audio content. In other embodiments, a user may simply attempt to activate any decoding feature and/or application of their user device when consuming some media content potentially containing an audio pattern mixed with the underlying audio content. Even further, in some embodiments, encoding/decoding application 162 may passively monitor audio communications 140 to determine audio patterns and provide a viewable list of received and determined audio patterns and/or decoded messages to the user.

At step 312, the user device determines the audio pattern from the mixed audio content. The user device may separate the audio pattern from the mixed audio content, for example, by using encoding/decoding application 162 to determine audio patterns. When audio pattern data is detected, it may be copied to a buffer of the user device for analysis.

Once the audio pattern has been determined, the audio pattern may be decoded using a decoding scheme corresponding to the encoding scheme used to create the audio pattern. At step 314, the audio pattern is decoded by the user device. Encoding/decoding application 162 may include a decoding scheme and process in addition to the audio pattern recognition process. The decoding scheme may be utilized with the decoding process to determine a text and/or data message from the audio pattern. The message may be stored in database 170 as messages 172.

As described above, audio patterns may include sound samples and silent samples. In one embodiment described above, the audio pattern to designate each bit utilizes a "triple chunk" pattern that includes sets of 3 samples of known length, wherein the middle sample corresponds to either an increasing/decreasing amplitude sine wave sample, or a silent sample. Thus, the difference between binary 1 and 0 is the appearance of a sine wave of 19 kHz. When audio data is streamed to a buffer, data chunks of 3 samples using the known length may be extracted for analysis. For every data chunk, fast Fourier transform (FFT) may be applied on the audio samples and the amplitude energy around the 19 kHz frequency may be computed. A maximum frequency response, $E_{max}$, in a range surrounding 19 kHz may also be utilized due to environmental or energy issues. In certain embodiments, the format of the audio signal input from microphone is 16-bit mono PCM and the sample rate at commonly used 44.1 kHz. If k=1024 equals the known length, after FFT, the output is an array of 1024 coefficients (C) equal to 1024 input samples. For any specific frequency f, the corresponding frequency response $E_f$ is computed by:

$$\text{bin} = 2 * f * N_{frame}/R_{sample},$$

where $N_{frame}=1024$ and $R_{sample}=44100$ $$E_f = (C[\text{bin}])^2 + (C[\text{bin}+1])^2$$

If maximum response $E_{max}$ is detected at frequency $f_{max}$, the data chunk is converted into binary according to the following rule: If $E_{max} > T$ and $|f_{max}-19000| \leq 430.6$, where T equals a fixed threshold value, assign binary 1 to the data chunk, otherwise, assign binary 0 to the data chunk.

In other embodiments, the Goertzal algorithm may be used to detect an encoded audio pattern. The Goertzal algorithm provides for evaluation of a Discrete Fourier Transform using a small number of selected frequencies efficiently. For example, if the specific frequency is set at 19 kHz, the Goertzal algorithm may be utilized to analyze an incoming audio signal and detect the start of an audio pattern. After detecting the start of an audio pattern, an FFT may be utilized for decoding the audio pattern.

As described above, an audio pattern chunk corresponding to 010 may correspond to bit 1 and an audio pattern chunk corresponding to 000 may correspond to bit 0. However, noise in the transmit channel and issues with synchronization may cause a transmitted data chunk to not align with a received data chunk. For example, the k=1024 samples may spread to two consecutive samples, creating 110, 011, or other data chunks. Accordingly, when decoding the audio pattern, the binary triples corresponding to 000, 100, 001, and 101 may be mapped to bit 0, while 010, 110, 011, and 111 may be mapped to bit 1.

However, in the above described process to determine whether a maximum frequency response, $E_{max}$, is greater than the fixed threshold value T, frequency responses to the 19 kHz wave may be different on different devices and in different environments. Thus, the fixed threshold value T may be dynamically updated according to the current situation. In certain embodiments, T may be set to an initially small value. After the start notification is detected, T may be dynamically updated The following equation may be utilized in certain embodiments to update T, where ($E_1$, $E_2$, $E_3$) denotes the frequency responses of the 3 corresponding data samples or "chunks," and $T_E$ is the dynamically updated fixed threshold value:

$$r = \frac{\max(E_1, E_2, E_3)}{E_1 + E_2 + E_3};$$

$$T_E = w_1 * T_E + w_2 * [(E_1 + E_2 + E_3) * (p/r)]$$

where $$w_1 + w_2 = 1;$$

$$T_E = \begin{cases} T_0, & \text{if } T_E < T_0; \\ T_E, & \text{if } T_E \geq T_0; \end{cases}$$

Notice that the sum of ($E_1$, $E_2$, $E_3$) is approximately equal to the frequency energy of the 19 kHz sine wave of single bit information, no matter which binary triple pattern of bit 1 is received. The ratio $r \in [\frac{1}{3}, 1]$ indicates the degree that the 1024 samples of 19 kHz sine wave aligned with the received data chunk. The closer r is to 1, more of the 1024 samples are within one received data chunk. In one embodiment, p=0.5% is set to use around 1% the total energy of the 19 kHz component as the threshold value to determine the presence of 19 kHz signals. Thus, the r automatically adjusts the threshold value according to the synchronization of the 19 kHz sine wave samples. If the samples are separated into more than one data sample or "chunk," the total frequency response will be reduced and r becomes smaller. In this situation, the larger percentage of total frequency response is used as the threshold value. If the samples are received in one data chunk, the total frequency response will be large and r will be close to maximum value 1. In this situation, smaller percentage of total frequency response is used as the threshold value.

When the encoding/decoding application is activated to receive and determine an audio pattern, the encoding/decoding application may wait to detect audio patterns as described above. Once audio patterns are detected, the encoding/decoding application may wait for a start notification. The start notification may correspond to an identifiable code section that instructs the encoding/decoding application it is the start of a message. In one embodiment, the start notification may include an 8 bit group of all bit 1s.

After recognizing the start notification, the encoding/decoding application on the user device may further detect a length code. As described above, the length code may indicate the length of data in the binary stream. Once the start notification and a length code are determined, the encoding/decoding application may begin receiving the subsequent audio pattern. The encoding/decoding application may receive the binary stream of the audio pattern until the number of characters or data amount specified in the length code is received. At the completion of the data reception, a computed LRC sum is determined by the encoding/decoding application. The LRC sum may be computed using: n=LENGTH*6/8. If the computed LRC sum matches a given LRC sum at the end of the binary stream, then audio pattern has been fully received and may be decoded using the same character to value mapping used to encode the audio pattern. If the computed LRC sum and the given LRC sum are different, then the encoding/decoding application may return to the start to again wait for a start notification.

Noise and/or synchronization issues can create difficulties in detecting the start notification if the frequency response is propagated to neighboring samples. Thus, in certain embodiments, 8 groups of binary triples may be counted, where each group's second data sample has a maximum frequency response corresponding to 19 kHz. If there are more than 4 groups satisfying this requirement, then that specific location may be utilized as the start notification. However, if 4 groups do not match, the data may be shifted one sample to the right and then analyzed to see if the next 8 bits match the start notification.

Once a message has been received and decoded from the audio pattern, the user device may display the message at step 316. User device 160 may utilize display 184 to display messages. In addition to displaying the message, the audio pattern may further contain processes for execution by the user device in certain embodiments. Thus, the user device may further execute a process associated with the message such as initiating a data retrieval process on a user device, navigating to a website using a user device web browser, and transmitting a second audio pattern corresponding to a user action. Display 184 may further render for display any results, images, or other data of the executed process.

Thus, the above embodiment may be utilized in a radio, TV, online streaming, video playback, or other broadcast in order to give users more accessibility to products and an easier purchasing experience. A radio and/or television broadcast may utilize the audio patterns to transmit information to a user in real-time without any user interaction. Additionally, users of online streaming broadcasts may receive audio patterns during advertisements or including with music and/or video playback. Audio patterns may be further included in prerecorded video playbacks, such as DVDs. For merchants and service providers, this may correspond to providing coupons, offers for sale, or other purchase options. The message may include a merchant and/or service provider URL the user may visit to see product details. In other embodiment, the message may include a code or identification that may be submitted, for example using the encoding/decoding application, to a merchant and/or service provider website to retrieve product details. Moreover, users may store the messages and recall them for later analysis and use.

In other embodiments, offline retailers may utilize an encoding device in proximity with their retail environment. Thus, audio patterns may be localized to a specific area and broadcast to consumers who enter the area. The consumer may check their phone and become aware of purchasing sales, coupons, available products, or other information a retailer may wish to convey. This broadcast can approximate a geo-fencing of the retail environment and be offered by a plurality of retailers in close proximity. For example, each store in a shopping mall may include inaudible audio patterns with foreground music and/or voice. The customer may receive the message, and may receive an additional process for execution, such as visiting a stores webpage or social networking link, or "checking-in" to the store location using other device applications.

In certain embodiments, the encoding device may correspond to a different user device and enable device-to-device communications. In such embodiments, the devices may communicate personal information, shopping information, or online information. The devices may transmit processes to the other device, such as engaging in a social networking interaction, or providing other data.

Figure 4:
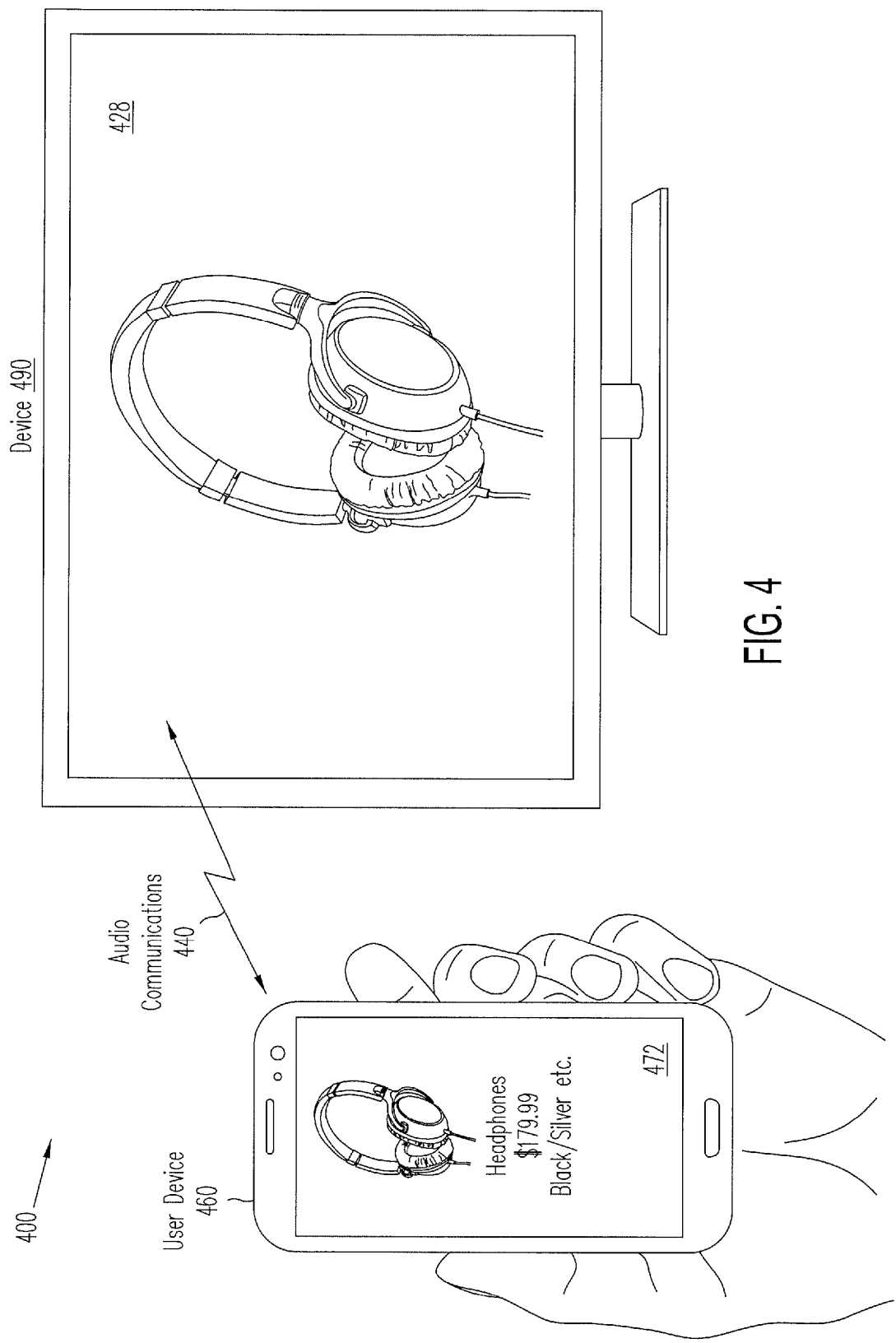
FIG. 4 is a system environment including a user device displaying product information corresponding to a received audio pattern.

In certain embodiments, a user device may be configured to encode data, such as that contained in user responses 174, into another audio pattern. Thus, the user device may be configured to likewise transmit user responses back to the encoding device using a transceiver of the user device, such as transceiver 180. In other embodiments, the user device may utilize a network, such as network 150, to communicate with the encoding device and transmit data. These responses by the user device can be utilized to determine approximate locations of users, to receive user responses to transmitted messages, identify users, or convey other useful information to the encoding device. FIG. 4 illustrates a system environment including a user device displaying product information corresponding to a received audio pattern. System environment 400 of FIG. 4 shows an example of step 208 of FIG. 2 continuing to steps 310 through 316 of FIG. 3. System environment 400 contains device 490 displaying media content 428 with audio communications 440. Device 490 may receive media content 428 containing audio communications 440 from an encoding device (not shown in FIG. 4) as described above. However, in other embodiments, device 490 may correspond to the encoding device and perform the encoding of an audio pattern from a message with transmission of audio communications 440.

A user views media content 428, for example, when browsing through television programs. In response to media content 428, the user may activate an application of user device 460. User device 460 may then receive audio communications 440. In response to receiving and decoding audio communications 440, user device 460 displays message 472. In the embodiment of FIG. 4, media content 428 corresponds to a commercial advertisement. The commercial advertisement includes audio content, such as background music and actor dialogue selling a product. Using the methods discussed in FIGS. 2 and 3, a message for transmission to a user device is received by an encoding device, encoded to an audio pattern, and mixed with the audio content. The audio pattern is then transmitted from device 490 to user device 460 using audio communications 440 and decoded by user device 460 into message 472.

Shown on user device 460 is message 472 decoded from the audio pattern in audio communications 440. Message 472 displays product information and purchase product details. As previously discussed, device 490 transmitting audio communications 440 may include an audio pattern for decoding by user device 460 in audio communications 440. After decoding, a message may be displayed on user device 460. The message may contain data to display product information and purchase product details. However, in other embodiments, the message may contain a URL, hyperlink, or process. Thus, through a displayed URL, embedded hyperlink, and/or embedded process, user device 460 may navigate to product details. As shown in FIG. 4, message 472 contains details and purchase options for the product displayed on device 490. Thus, a user viewing device 490 and desiring the advertised product is able to quickly and easily receive message 472 with a purchase option.

FIG. 4 is presented by way of example and is not intended to be limiting to the present disclosure. The embodiments of FIG. 4 present one example of message and corresponding purchase option. Thus, other embodiments may contain different devices and/or communications. For example, in other embodiments, the received and decoded message may contain an advertisement, coupon, and/or social network interaction. Embedded processes in the message may include a data retrieval process on user device 460, website navigation using user device web browser, and responsive audio pattern transmission. In embodiments, where device 490 corresponds to an offline retail environment, message 472 and associated product purchase details may be location-specific.

Figure 5:
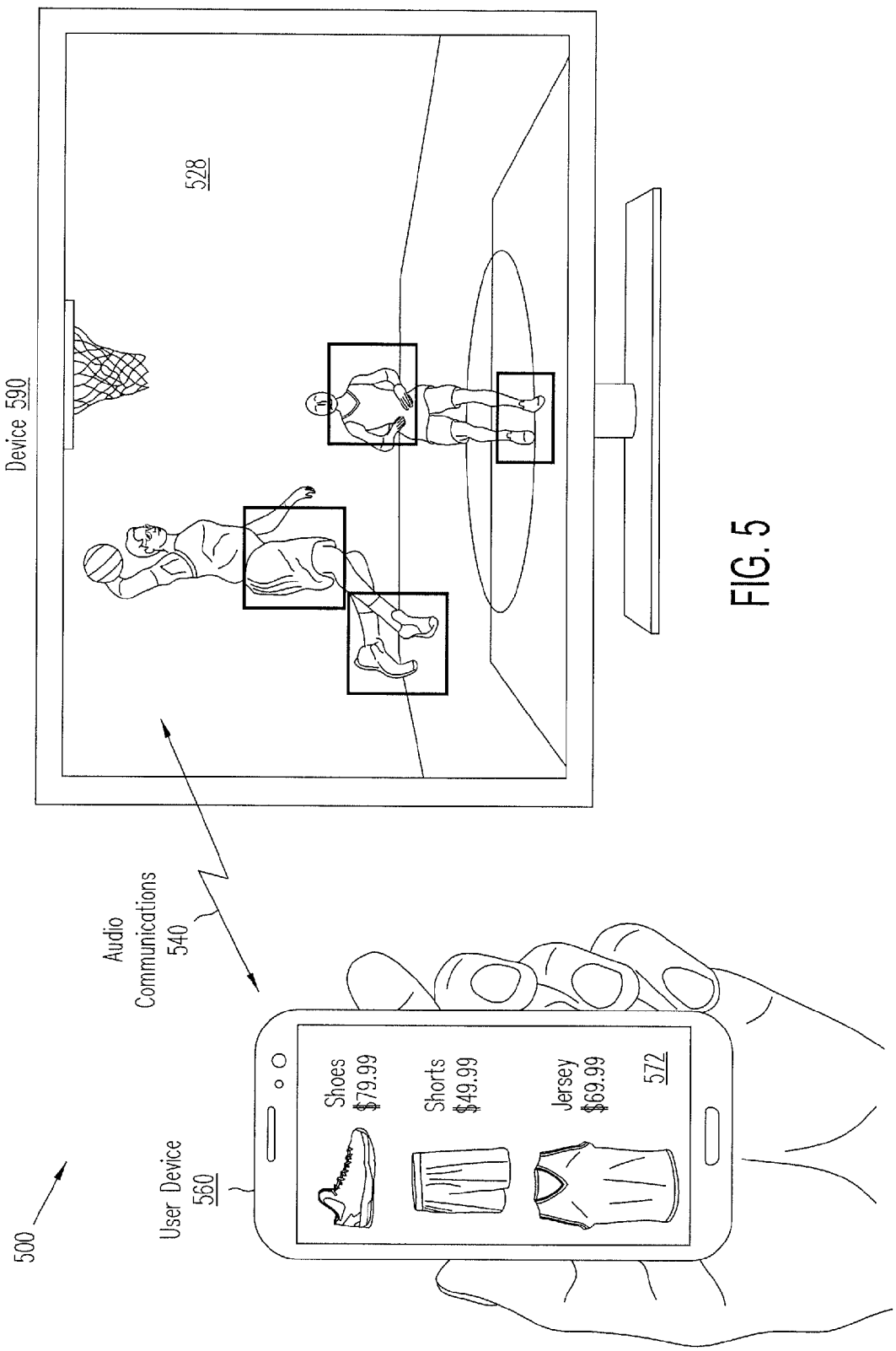
FIG. 5 is a system environment for receiving product information during media consumption.

FIG. 5 is a system environment for receiving product information during media consumption. Similar to FIG. 4, system environment 500 of FIG. 5 contains device 590 displaying media content 528 and transmitting audio communications 540. However, in system environment 500, products are not directly advertised. Thus, a user of user device 560 may or may not activate an application to receive audio communication 540 for decoding.

A user of user device 560 may consume media content 528, for example watching a sports game as shown in FIG. 5. Media content 528, in other embodiments, may further correspond to television shows, movies, radio content when device 590 corresponds to a radio device, or other media content. During consumption of media content 528, the user may view various products, shown in FIG. 5 as basketball shoes and/or apparel. While viewing media content 528, audio communications 540 may be transmitted containing audio code corresponding to products displayed and/or used in media content 528.

In some embodiments, the user may view media content 528 and decide they would like to purchase or look up the product the user is viewing. Thus, the user may activate an application on user device 560 and receive audio communications 540. As described above, audio communications 540 may be separated, decoded, and message 572 containing product information and purchase product details displayed to the user.

However, in various embodiments, an application of user device 560 may passively monitor audio sensors of user device 560 to receive audio communications. Thus, the device may operate in the background of an operating system of user device 560 to receive audio communications 540. In such embodiments, audio communications may be received and messages 572 may be displayed to the user of user device 560 after prompting, for example opening the application and requesting to view messages 572. This enables the user to review products seen in media content 528 at some later time and at the user's request.

Figure 6:
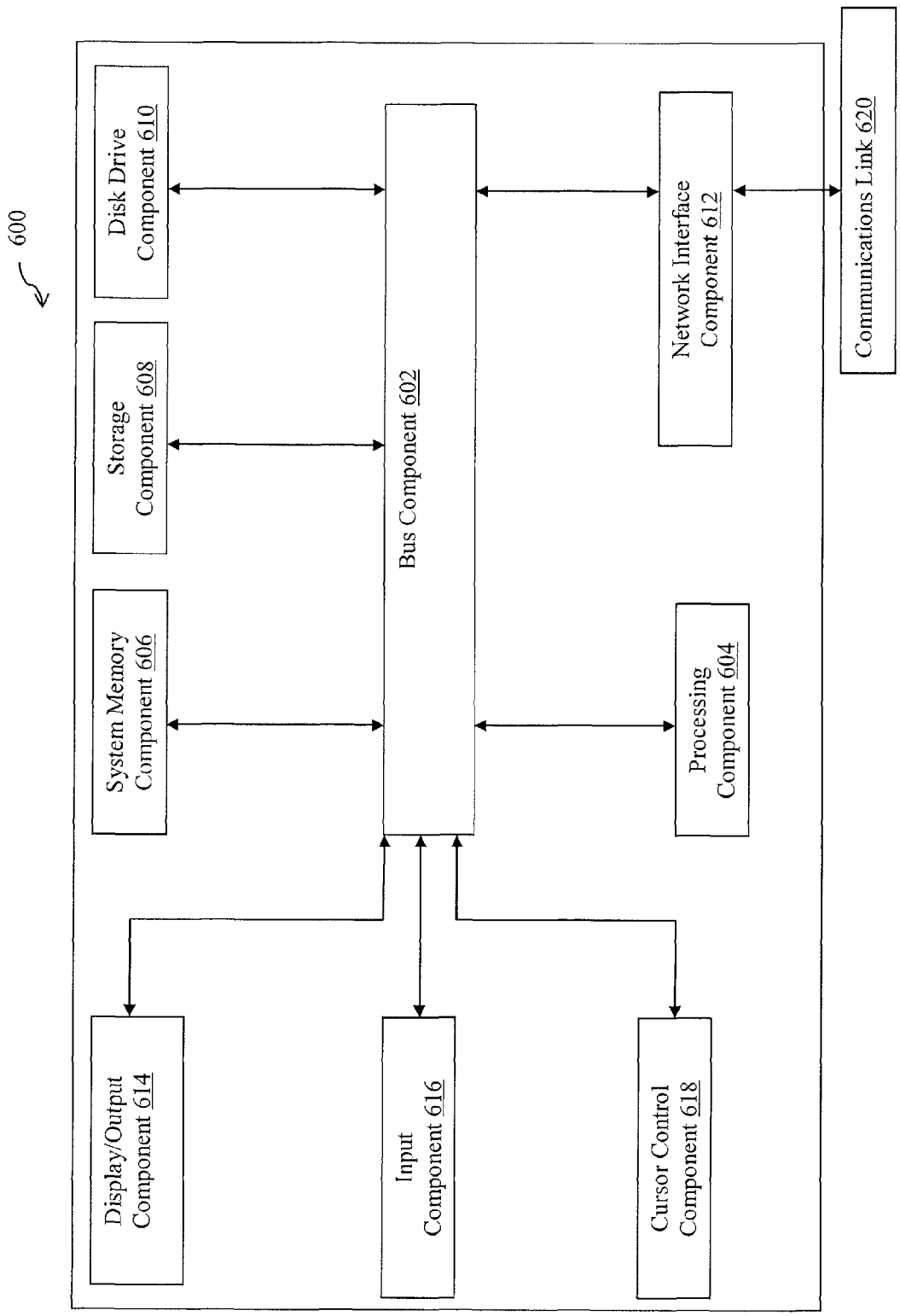
FIG. 6 is a block diagram of a computer system suitable for implementing one or more components in FIG. 1 according to one embodiment of the present disclosure.

Referring now to FIG. 6, a block diagram of a system 600 is illustrated suitable embodiments of the present disclosure, including encoding device 110 and user device 160 of FIG. 1. System 600, such as part of a cell phone, a tablet, a personal computer and/or a network server, includes a bus 602 or other communication mechanism for communicating information, which interconnects subsystems and components, including one or more of a processing component 604 (e.g., processor, micro-controller, digital signal processor (DSP), etc.), a system memory component 606 (e.g., RAM), a static storage component 608 (e.g., ROM), a network interface component 612, a display/output component 614 (e.g., visual display or alternatively, an interface to an external display, speaker and/or other audio output means, and other visual and audio output devices), an input component 616 (e.g., keypad or keyboard, touch sensitive surface, microphone receiver, and other input devices), and a cursor control component 618 (e.g., a mouse pad).

In accordance with embodiments of the present disclosure, system 600 performs specific operations by processor 604 executing one or more sequences of one or more instructions contained in system memory component 606. Such instructions may be read into system memory component 606 from another computer readable medium, such as static storage component 608. These may include instructions to encode audio patterns, decode audio patterns, mix audio patterns with an audio content, analyze user responses to messages corresponding to audio patterns, etc. In other embodiments, hard-wired circuitry may be used in place of or in combination with software instructions for embodiment of one or more embodiments of the disclosure.

Logic may be encoded in a computer readable medium, which may refer to any medium that participates in providing instructions to processor 604 for execution. Such a medium may take many forms, including but not limited to, non-volatile media, volatile media, and transmission media. In various embodiments, volatile media includes dynamic memory, such as system memory component 606, and transmission media includes coaxial cables, copper wire, and fiber optics, including wires that comprise bus 602. Memory may be used to store visual representations of transmittable messages, results of executed processes, and other data. In one example, transmission media may take the form of acoustic or light waves, such as those generated during radio wave and infrared data communications. Some common forms of computer readable media include, for example, RAM, PROM, EPROM, FLASH-EPROM, any other memory chip or cartridge, carrier wave, or any other medium from which a computer is adapted to read.

In various embodiments of the disclosure, execution of instruction sequences to practice the disclosure may be performed by system 600. In various other embodiments, a plurality of systems 600 coupled by communication link 620 (e.g., network 150 of FIG. 1, LAN, WLAN, PTSN, or various other wired or wireless networks) may perform instruction sequences to practice the disclosure in coordination with one another. Computer system 600 may transmit and receive messages, data, information and instructions, including one or more programs (i.e., application code) through communication link 620 and communication interface 612. Received program code may be executed by processor 604 as received and/or stored in disk drive component 610 or some other non-volatile storage component for execution.

In view of the present disclosure, it will be appreciated that various methods and systems have been described according to one or more embodiments for monitoring seller URLs. Although various components and steps have been described herein as being associated with encoding device 110 and user device 160 of FIG. 1, it is contemplated that the various aspects of such devices and/or servers illustrated in FIG. 1 may be distributed among a plurality of devices, servers, and/or other entities.

Where applicable, various embodiments provided by the present disclosure may be implemented using hardware, software, or combinations of hardware and software. Also where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the spirit of the present disclosure. In addition, where applicable, it is contemplated that software components may be implemented as hardware components, and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. It is contemplated that various alternate embodiments and/or modifications to the present disclosure, whether explicitly described or implied herein, are possible in light of the disclosure. For example, although transactions have been described according to one or more embodiments, it should be understood that the present disclosure may also apply to transactions where requests for information, requests for access, or requests to perform certain other transactions may be involved.

Having thus described embodiments of the disclosure, persons of ordinary skill in the art will recognize that changes may be made in form and detail without departing from the scope of the disclosure. Thus the disclosure is limited only by the claims.

What is claimed is:

1. A system comprising:
a non-transitory memory storing computer-executable instructions and a plurality of messages; and
one or more hardware processors coupled to the non-transitory memory and configured to read the computer-executable instructions from the non-transitory memory to cause the system to perform operations comprising:
encoding a message into an audio pattern, the message being selected from the plurality of messages;
mixing the audio pattern with an audio content to generate a mixed audio content such that the audio pattern included in the mixed audio content is inaudible to a human ear;
broadcasting the mixed audio content to one or more media output devices, the broadcasting causing the mixed audio content to be output through the one or more media output devices;
receiving, from a user device, a user response to the message encoded in the audio pattern that is included in the mixed audio content output by the one or more media output devices; and
adjusting, based on the user response, a frequency with which the message is selected for future transmissions.

2. The system of claim 1, wherein the message comprises one or more of an advertisement, a coupon, a purchase option, and a social network interaction.

3. The system of claim 1, wherein the user response is encoded in a second audio pattern.

4. The system of claim 1, wherein the message includes instructions that cause the user device to perform a process selected from a group consisting of initiating a data retrieval process on the user device and navigating to a website using a web browser included in the user device.

5. The system of claim 1, wherein the audio pattern is location-specific.

6. The system of claim 1, wherein the audio content is selected from the group consisting of an audio portion of a television broadcast content and a radio broadcast content.

7. The system of claim 1, wherein the audio pattern is further encoded with a start notification prior to the message encoded in the audio pattern.

8. The system of claim 7, wherein the start notification comprises an 8-bit coding of binary 1 in an audio wave.

9. The system of claim 1, wherein each data portion of the message is encoded as a three portion tuple of binary values in an audio wave.

10. The system of claim 1, wherein the operations further comprise:
calibrating the audio pattern based on device capabilities of a device of a user receiving the audio pattern, wherein the device capabilities include frequency limitations detectable by the device.

11. A non-transitory machine-readable medium having stored thereon machine-readable instructions executable to cause a machine to perform operations comprising:
encoding a message into an audio pattern, the message being selected from a plurality of stored messages;
mixing the audio pattern with audio content to generate a mixed audio content such that the audio pattern included in the mixed audio content is inaudible to a human ear;
broadcasting the mixed audio content to one or more media output devices, the broadcasting causing the mixed audio content to be output by the one or more media output devices;
receiving, from a user device, a user response to the message encoded in the audio pattern that is included in the mixed audio content output by the one or more media output devices; and
adjusting, based on the user response, a frequency with which the message is selected for future transmissions.

12. The non-transitory machine readable medium of claim 11, wherein the message comprises one or more of an advertisement, a coupon, a purchase option, and a social network interaction.

13. The non-transitory machine readable medium of claim 11, wherein the user response is encoded in a second audio pattern.

14. The non-transitory machine readable medium of claim 11, wherein the message includes instructions that cause the user device to perform a process selected from a group consisting of initiating a data retrieval process on the user device and navigating to a website using a web browser included in the user device.

15. The non-transitory machine readable medium of claim 11, wherein the audio pattern is location-specific.

16. The non-transitory machine readable medium of claim 11, wherein the audio content is selected from the group consisting of an audio portion of a television broadcast content and a radio broadcast content.

17. The non-transitory machine readable medium of claim 11, wherein the operations further comprise:
calibrating the audio pattern based on device capabilities of the user device receiving the audio pattern, wherein the device capabilities include frequency limitations detectable by the user device.

18. A method for use by an encoding device for data communication using audio patterns, the method comprising:

encoding, by a hardware processor of the encoding device, a message into an audio pattern, the message being selected from a plurality of stored messages;

mixing the audio pattern with audio content to generate a mixed audio content such that the audio pattern included in the mixed audio content is inaudible to a human ear;

broadcasting the mixed audio content to one or more media output devices, the broadcasting causing the mixed audio content to be output by the one or more media output devices;

receiving, from a user device, a user response to the message encoded in the audio pattern that is included in the mixed audio content output by the one or more media output devices; and adjusting, based on the user response, a frequency with which the message is selected for future transmissions.

19. The method of claim 18, wherein the user response is encoded in a second audio pattern.

20. The method of claim 18, wherein the message includes a process for execution by the user device.

21. The method of claim 18, further comprising:
calibrating the audio pattern based on device capabilities of the user device receiving the audio pattern, wherein the device capabilities include frequency limitations detectable by the user device.

\* \* \* \* \*